US006769467B2

(12) United States Patent
Escobedo et al.

(10) Patent No.: US 6,769,467 B2
(45) Date of Patent: Aug. 3, 2004

(54) APPARATUS FOR APPLYING A MATTE FINISH TO PHOTOGRAPHS AND ARTICLE

(75) Inventors: Sergio Escobedo, San Diego, CA (US); Scott Matthew Dennis, San Diego, CA (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/066,235

(22) Filed: Feb. 2, 2002

(65) Prior Publication Data

US 2003/0148067 A1 Aug. 7, 2003

(51) Int. Cl.[7] .................................................. B32B 31/20

(52) U.S. Cl. ........................ 156/367; 156/368; 156/552; 156/553; 156/555; 156/582; 156/583.1

(58) Field of Search ................................. 156/209, 219, 156/220, 553, 582, 367, 368, 552, 555, 580, 581, 583.1; 264/284, 293; 101/6, 23, 32, 18; 425/385, 367, 409; 700/95

(56) References Cited

U.S. PATENT DOCUMENTS 2,675,852 A * 4/1954 Pasquale ..................... 156/209
2,793,677 A * 5/1957 Armstrog .................... 156/536
2,803,188 A * 8/1957 Duvall ......................... 101/32
3,730,080 A * 5/1973 Deligt ......................... 101/23
3,758,970 A 9/1973 Annenberg
3,799,827 A * 3/1974 Takimoto et al. ........... 156/219
3,871,947 A 3/1975 Brekken
4,305,768 A 12/1981 Lontz
4,545,838 A * 10/1985 Minkus et al. .............. 156/220
4,776,912 A * 10/1988 Laval .......................... 156/209
4,798,639 A * 1/1989 Yamaguchi ................ 156/73.1
4,919,738 A * 4/1990 Ball et al. .................. 156/73.5
5,232,535 A * 8/1993 Brinley ....................... 156/219
5,799,525 A * 9/1998 Johnson et al. ............... 72/105
6,460,687 B1 10/2002 Escobedo et al.

* cited by examiner

*Primary Examiner*—Gladys J P Corcoran
(74) *Attorney, Agent, or Firm*—Frank Pincelli

(57) ABSTRACT

Disclosed is an embosser for producing matte finish photographs from a glossy finish photograph. The embosser receives a sheet of glossy prints as generated by an inkjet printer with a clear laminate over the print to protect the inkjet generated photographic image. Pressure and embossing rollers biased to spaced apart positions within the embosser are selectively operable to move one against the other to create a nip through which the laminated print passes. At the option of an operator the laminated print may be allowed to pass between the spaced apart rollers undisturbed thereby generating a glossy photograph. At the option of the operator the rollers are moved one against the other to create the nip so that passage of the print now results in an embossment of the lamination thereby producing a matte finish photograph. Also disclosed is a method for alternatively generating a glossy or matte finish print and a matte finished print wherein the matte finish is formed in situ.

8 Claims, 1 Drawing Sheet

APPARATUS FOR APPLYING A MATTE FINISH TO PHOTOGRAPHS AND ARTICLE

CROSS REFERENCE TO RELATED CASES

None.

TECHNICAL FIELD

The present invention relates generally to a photofinishing operation. More particularly the invention relates to a photofinishing operation that is capable of producing either glossy or matte finished photographs.

BACKGROUND OF THE INVENTION

In photofinishing operations it is conventional to develop and print photographs on roll stock photographic paper having a width that generally accommodates one size of print. After printing out a roll of photos on a strip of the roll stock, the strip is cut to provide the individual prints. Advancements in photofinishing allow for the production of photographs by inkjet printers, laser printers and other photofinishing printers including silver-halide systems that receive a digital input and employ conventional wet chemistry output. The use of computers in connection with these advancements allows for further improvement. For example, it is not necessary to use roll stock having the width of a desired finished photo. A photofinishing printer now can generate photos of various sizes on a single sheet of print media. Also the images can be manipulated to nest various image sizes on a single larger sheet. Accordingly, a sheet or roll stock of a single width can be used to generate prints of various sizes for a single customer order.

However, a draw back of using an inkjet printer or the like in a photofinishing operation is that the resulting photographic images are subject to durability and fading problems. For example, the printed image can be eroded by abrasion. In order to improve print durability, of any inkjet printed image, it is known to apply a laminate to the printed surface. The resulting laminated photograph tends to take on the characteristics of the paper stock on which the image is printed. For example, the paper stock may have either a glossy or a matte finish and the laminated product will have a like finish.

For a photofinisher to provide a customer with a choice of finishes (either matte or glossy), it has been necessary for the photofinishing operation to stock photographic papers of each finish and to switch papers as needed for a given customer order. Larger photofinishing operations may have several photofinishing machines wherein one of the machines is dedicated to producing photographs of a matte finish. However, rather than carry an inventory of various sizes of paper in each of the two finishes and taking the time to change the paper supply in response to a customer request for one type of finish or another, photofinishing operations generally do not offer the customer a choice of finishes. If a choice of finishes is offered, it generally is in connection with a special promotion.

Accordingly, it is an object of the present invention to provide an apparatus and method for producing both glossy and matte finished photographs from the same photographic paper stock.

Another object is to provide an apparatus and method for converting a glossy photograph to one having a matte finish.

Yet another object is to provide an apparatus and method for providing an inkjet printed image having a protective laminate in either a glossy or matte finish.

Yet another object is to provide photograph inkjet printed on glossy paper yet having a matte finish.

SUMMARY OF THE INVENTION

In the present invention a photofinishing system is provided wherein an inkjet printer generates the photographic images. The print medium preferably is a conventional glossy finish photographic paper. To protect the inkjet printed image, the printed sheet is fed to a laminator that applies a clear protective lamination over the printed image. In accordance with the present invention, the lamination then is selectively treated to provide it with a matte finish. This is accomplished by heating the lamination and embossing the heated laminate surface to apply texture. Light reflecting off of the embossed surface at different rates provides the appearance of a matte finish. In this fashion a photographic paper normally having a glossy finish is converted to a matte finish. If a glossy finish is desired, the laminated product is simply ejected from the laminator without embossing. Thus, at the option of the operator, the operation can produce photographs from the same glossy photographic stock that selectively has either a glossy or matte finish.

Accordingly, the present invention may be characterized in one aspect thereof by an apparatus for producing a matte finish photographic print comprising:

a) a laminator for applying a clear protective laminate over a photographic image having a glossy finish surface to produce a laminated glossy finish photograph;

b) an embosser arranged to receive the laminated photograph and including means for moving the laminated photograph along a path of travel from an inlet to an exit; and c) an embossing roller arranged at one side of the path of travel, the roller having a textured outer surface and the clear protective laminate being selectively engaged against the embossing roller for embossing the laminate with a texture that produces a matte finish thereby selectively converting the glossy finish photograph to a matte finish.

In another aspect the present invention may be characterized by a method for producing a matte finish photographic print comprising:

a) providing a photographic image having a glossy finish surface;

b) laminating a clear protecting laminate to the glossy finish surface to produce a laminated glossy finish photograph; and c) selectively embossing a textured pattern into the clear protective laminate to produce a laminated matte finish photograph.

In still another aspect, the present invention may be characterized by a matte finish photograph comprising:

a) a first layer comprising a sheet of photographic paper having a glossy finish surface and a printed image on the glossy finish surface to provide a glossy finish photograph;

b) a second layer comprising a clear protective laminate applied to and extending over the printed image; and c) the laminate having a textured outer surface and the textured surface being formed in situ to provide the glossy finish photograph with a matte finish appearance.

DETAILED DESCRIPTION OF THE INVENTION

Figures 1, 2, 3, 4:
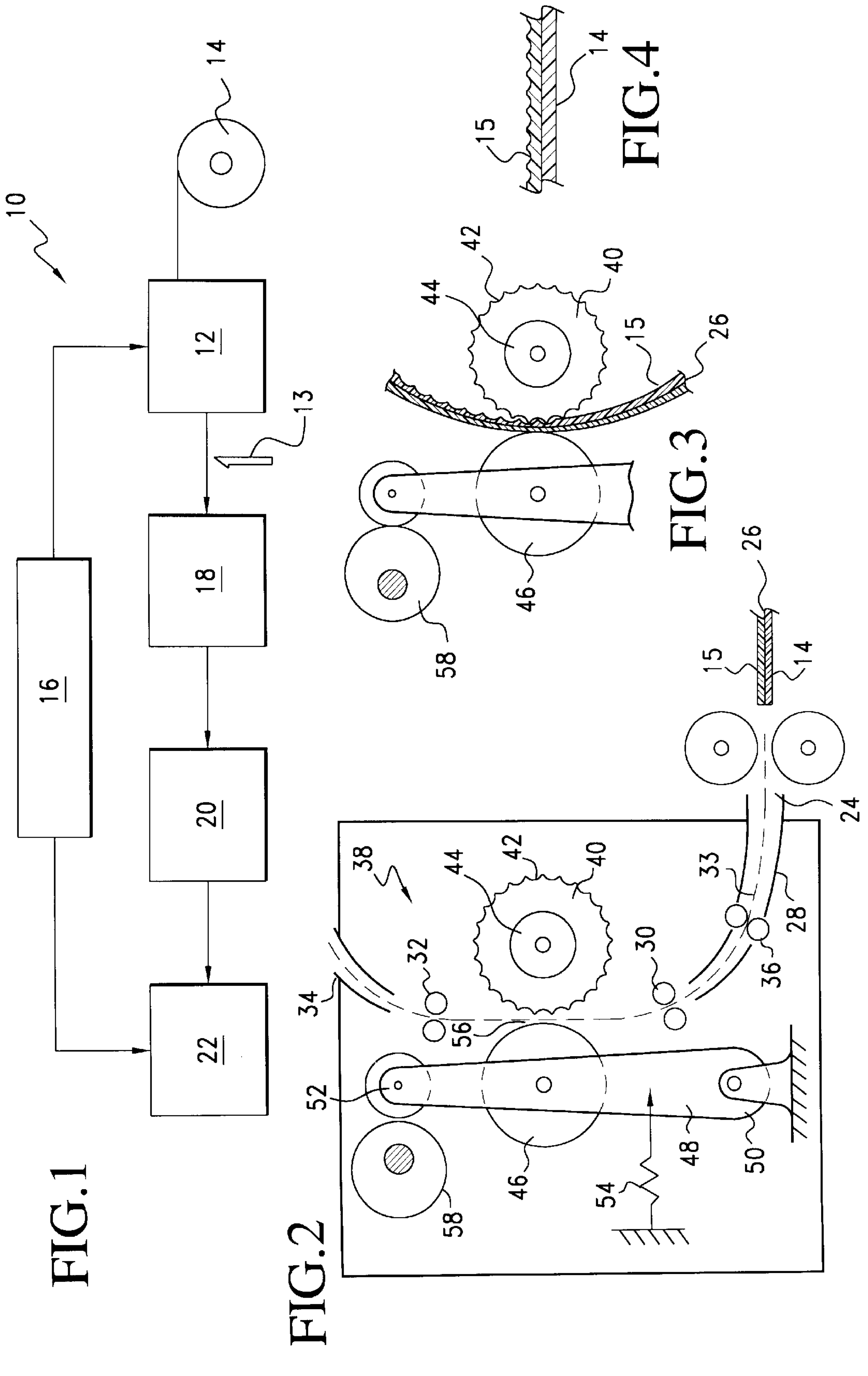
FIG. 1 shows a sequence of steps for producing a inkjet printed photograph according to the present invention.
FIGS. 2 and 3 are schematic illustrations of the apparatus for embossing a laminated photographic image in different operative positions.
FIG. 4 is a view showing, in cross section, a portion of a matte finish photograph in accordance with the present invention.

Referring to the drawings, FIG. 1 shows generally the sequence of steps for producing an inkjet printed photograph. In this respect the apparatus generally indicated at 10 includes an inkjet printer 12. The printer is fed from a continuous roll of photographic paper 14 that preferably is a conventional paper used in inkjet printing to produce glossy photographs. A computer 16 that has been loaded with a digital representation of the image or images to be printed controls the printer. The printed output passes from the inkjet printer and into a coater/laminator 20. The printer and laminator generally have different operational speeds so a buffer 18 is disposed between the two. The buffer 18 serves to operatively connect the printer to the laminator by first accommodating the output from the printer and then handing the printer output off to the laminator.

In the laminator, a protective laminate is applied to the printed surface of the photographic paper. The laminate is any suitable clear plastic 0.5 to 1.0 mil film that is applied to the printed surface of the paper. The paper and laminate then pass through a nip (not shown) that presses the two together, preferably with heat so the laminate is adhered to the image surface. Since the photograph is on glossy paper and both surfaces of the laminate are smooth, the result is a laminated, glossy finish photograph.

From the coater/laminator, the laminated structure passes into an embosser 22. While not shown, there may be a buffer between the laminator 20 and the embosser 22 in cases where the two have different operational speeds. The embosser is selectively operated either to produce a glossy finish photograph or a photograph having a matte finish. Information as to whether to produce either finish of photograph is inputted to the computer 16. The computer then controls the embosser as set out hereinbelow to produce the desired finish.

As shown in FIG. 2, the embosser 22 has an inlet 24 for receiving the laminated glossy finish print output 26 of the laminator. The print 26 includes a section of the photographic paper 14 including the inkjet-printed image and a section of laminate 15 disposed over the printed image and affixed to the paper. The inlet of the embosser connects to a guide track 28. The guide track and pairs of spaced drive rollers 30, 32 define a path of travel (indicated by a dotted line) through the embosser to an exit 34. Other drive rollers 36 may be located adjacent the track to facilitate the transport of a laminated photograph from the embosser inlet 24 to the exit 34. The spacing between pairs of drive rollers is small enough to accommodate the shortest photographic print delivered to the embosser.

Arranged along the path of travel and preferably between the roller pairs 30 and 32 is an embossing mechanism generally indicated at 38. The embossing mechanism includes an embossing roller 40 located at one side of the path of travel. The roller or at least the outer surface 42 of the roller is made of metal or other material that can be heated and retains heat. Preferably the embossing roller is hollow and has a heating element 44 disposed in the hollow for heating the roller and more particularly, for heating the outer surface 42. Any suitable heating device can be used including resistance or radiant heaters. Preferably the heater is a heating lamp incorporated into the embosser roller. A motor (not shown) drives the embossing roller.

The outer surface 42 of the embossing roller is textured by any suitable means such as by chemical etching or mechanical operation that will provide the roller with a degree of roughness. The roughness preferably is greater than 100 micro inches and sufficient, given various factors as set out hereinbelow, to provide the print out put 26 of the laminator with a matte finish. The texture of the outer surface should be as random as possible with no sharp points.

Located across the path of travel opposite the embossing roller is a pressure roller 46 having a resilient outer surface formed of a rubber or the like. The pressure roller is journaled to a lever arm 48. The lever arm has a pivotally supported end 50 and a free end 52 wherein the pressure roller is journaled to the arm intermediate the supported and free ends 50, 52 respectively. The lever arm is biased by a spring 54 or the like that urges the free end of the arm about its supported end 50 to the left or to a first position as viewed in FIG. 2. This creates a space 56 between the pressure roll 46 and the embossing roller 40 so as to maintain an open path of travel. It also maintains contact of the free end 52 of the lever arm with a mechanical cam 58. The cam is selectively operated to drive the lever arm free end 52 to the right and to a second position as viewed in FIG. 2. This closes the space 56 and causes the pressure roll 46 to bear against and form a nip with the embossing roller 40. Operation of the cam is under the control of the computer 16 so that the selective actuation of the cam to allow movement of the pressure roller between its first and second positions determines whether a glossy or matte finish photograph is produced as further set out hereinbelow.

The operation of the embosser 22 begins by heating the embossing roller 40. A proper operating temperature may vary depending upon the material of the laminate, the roughness of the outer surface 42 of the embossing roller and the pressure exerted at by the pressure roller. In any event when temperature is reached, the embosser is in condition to receive an image from the coater/laminator 20. Accordingly, as shown in FIG. 2, the laminated glossy finish print 26 oriented with its laminated side positioned on the same side of the path of travel as the textured embossing roller 40, enters the inlet 24. The photograph is moved forward through a series of driven rollers, such as shown at 36, 30 along the path of travel toward the embossing roller 40.

If a glossy finish photograph is desired, the path of travel is kept open by maintaining the pressure roller in the position as shown in FIG. 2. This keeps the path of travel open so the laminated glossy finish photograph is transported through the space 56 without contacting the embossing roller. In this fashion the glossy finish is not disturbed as the laminated glossy finish photograph passes through the exit 34. Consequently, a glossy finish photograph moves through the embosser exit 34.

If a matte finish photograph is desired, the computer 16 causes the operation of cam 58. Operation of the cam causes the lever arm 48 to pivot to the right as shown in FIG. 2, which in turn causes the pressure roll 46 to create a nip between it and the heated embossing roller 40. Now, when a laminated print reaches the embossing roller, the print passes through the nip so the laminate 15 is contacted and pressed against the heated embossing roller. The heat of the embossing roller softens the laminate 15 and this allows the textured surface of the embossing roller to modify the surface of the laminate by embossing the texture of the outer surface 42 into the laminate. The result of this operation is that light now will reflect off the laminate surface at a different rate giving it the appearance of a matte finish. The photograph passes to the exit 34 and a matte finish photograph is produced from the glossy print.

The resulting matte finish photograph is shown in FIG. 4. As shown in FIG. 4, the photographic paper 14 is overlaid with the laminate 15 and the laminate has its outer surface embossed. This provides the photograph with a matte finish wherein the matte finish is applied in situ to the photograph as opposed to an initial printing of the photograph on a matte finish paper.

It is generally understood that a glossy image is one that generates values of between 60 and 70 on a 20° reflectivity scale. In contrast, an image having a matte finish is one considered to have reflectivity values generally below about 40 and preferably below about 10–26.

As noted above the various factors of temperature, pressure, the finish of the embossing surface and the particular material and thickness of the laminate are factors contributing to the production of a matte finish. For conventional plastic films used as photographic laminates as described herein, a temperature of the textured surface above 75° C. is too extreme as at this temperature, the laminate tends to delaminate from the print rather than be embossed. Conversely, a surface temperature of below about 50° C. appears to be too cold to accept texturing form the roller. Accordingly a temperature range of between 50° C. and 75° C. is considered an operable range.

The pressure at the nip and surface roughness of the embosser roller also are related in that the amount of force pressing on the laminated surface is directly proportional to the surface roughness of the embosser roll. Given the operational factors of the particular material used as the laminate, an acceptable range of parameters for the degree of surface roughness, the temperature of the embossing roll and the pressure applied are matters of design within the skill of the art.

Accordingly, it should be appreciated that the present invention accomplishes its intended objects in providing a method and apparatus for producing either a glossy finish or a matte finish photograph from the same glossy print stock. The apparatus allows the photofinishing operator to selectively make either glossy or matte prints without the need to inventory both glossy and matte finish print paper.

Having described the invention in detail, what is claimed as new is:

1. Apparatus for selectively producing either a laminated matte finish photographic print or a laminated glossy finish photographic print comprising:

a) a laminator for applying a clear protective laminate over a photographic image having a glossy finish surface to produce a laminated glossy finish photograph;

b) an embosser arranged to receive the laminated glossy finish photograph from the laminator and including means for moving the laminated glossy finish photograph along a path of travel from an inlet to an exit;

c) a heated embossing roller arranged at one side of the path of travel, the roller having a textured matte finish generating outer surface;

d) means for selectively pressing the clear protective laminate against the heated embossing roller for embossing the laminate with a texture that produces a matte finish generating a value below 40 on a 20° reflectivity scale thereby selectively converting the laminated glossy finish photograph to the laminated matte finish photographic print; and e) a gloss/matte finish print selector controlling the actuation of the means for selectively pressing the clear protective laminate against the heated embossing roller.

2. Apparatus as in claim 1 wherein the embossing roller includes a heater.

3. Apparatus as in claim 1 wherein said means for selectively pressing the clear protective laminate against the heated embossing roller comprises a pressure roller across the path of travel from the embossing roller, the pressure roller being selectively movable from and between a first position spaced from the embossing roller and a second position bearing against the textured surface of the embossing roller and the movement of the pressure roller to the second position causing a selective engagement of the embossing roller against the clear protective laminate for embossing the laminate.

4. Apparatus as in claim 3 including an actuator for selectively moving the pressure roller between the first and second position.

5. Apparatus as in claim 3 comprising:

a) a lever arm supported for movement towards and away from the embossing roller;

b) the pressure roller carried by the lever arm; and c) a cam selectively operated to engage and move the lever arm towards the embossing roller.

6. Apparatus as in claim 1 wherein the embossing roller has a hollow and a heater is disposed in the hollow.

7. Apparatus as in claim 1 wherein the embossing roller has a chemically etched surface comprising the textured surface.

8. Apparatus as in claim 1 wherein the textured surface comprises surface features having a height of at least 0.1 inches.

* * * * *